United States Patent
Phillips et al.

(10) Patent No.: US 8,693,365 B1
(45) Date of Patent: Apr. 8, 2014

(54) METHOD AND APPARATUS FOR STATE-BASED CHANNEL SELECTION METHOD IN MULTI-CHANNEL WIRELESS COMMUNICATIONS NETWORKS

(75) Inventors: Brian E. Phillips, Crownsville, MD (US); Murali Tummala, Monterey, CA (US); John McEachen, Carmel, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 172 days.

(21) Appl. No.: 13/487,494

(22) Filed: Jun. 4, 2012

Related U.S. Application Data

(60) Provisional application No. 61/496,720, filed on Jun. 14, 2011.

(51) Int. Cl.
    *H04L 1/00*     (2006.01)
    *H04W 4/00*     (2009.01)
    *H04W 28/18*     (2009.01)

(52) U.S. Cl.
    CPC .................................. *H04W 28/18* (2013.01)
    USPC ........................................... 370/252; 370/333

(58) Field of Classification Search
    CPC ........................... H04W 28/18; H04W 72/085
    USPC .......................................................... 370/252
    See application file for complete search history.

(56) References Cited

U.S. PATENT DOCUMENTS

2012/0195212 A1*    8/2012    Zhang et al. .................. 370/252

\* cited by examiner

*Primary Examiner* — Shaq Taha
(74) *Attorney, Agent, or Firm* — Naval Postgraduate School; Lisa A. Norris

(57) ABSTRACT

Embodiments in accordance with the invention provide a state-based channel selection method to improve the rate of successful transmissions for a multi-channel wireless network. Channels are monitored for performance, and, based upon performance, are placed in channel state vectors having increasing levels of desirability. The higher the state vector in which a channel is placed, the more desirable the channel is considered for selection. The channel in the highest state vector is considered for selection first. A channel not in the highest desirable state vector is eligible for selection when a channel is unavailable from higher desirable state vectors. Channels not in the highest desirable state vector, but also not in the lowest undesirable state vector, are monitored for improvement to move into higher desirable state vectors as they improve.

5 Claims, 12 Drawing Sheets

METHOD AND APPARATUS FOR STATE-BASED CHANNEL SELECTION METHOD IN MULTI-CHANNEL WIRELESS COMMUNICATIONS NETWORKS

CROSS-REFERENCE TO RELATED APPLICATIONS

This application claims the benefit of U.S. Provisional Application No. 61/496,720, filed Jun. 14, 2011, which is hereby incorporated in its entirety by reference.

BACKGROUND OF THE INVENTION

1. Field of the Invention

The present invention relates generally to channel selection in multi-channel wireless communications networks.

2. Description of the Related Art

Advances in computing and communication technologies have resulted in smaller, faster, economical, and more reliable network devices that enable communication among mobile users. Due to a crowded and harsh electromagnetic environment (e.g., weather, terrain features, jamming, interference and manmade obstructions) networking challenges include high latency, low bandwidth and poor reliability. Prior art multi-channel networks added a degree of freedom to wireless communications networks by dividing the allocated spectrum into multiple channels resulting in an increase in spatial reuse by accommodating simultaneous transmissions. Multi-channel wireless networks also exploited frequency diversity, and capacity was no longer limited to a single channel. However, challenges surfaced with the use of multiple channels.

In single channel networks, medium access protocols only need to decide when the channel is suitable for communication to reduce the likelihood of collisions between nodes in the medium. When multiple channels are available, a source-destination pair must select and be synchronized to a common idle channel before attempting a transmission. The goal of coordinating nodes was to minimize collisions during data transmission to avoid delay and unnecessary energy usage due to retransmissions.

In an N channel wireless network, M channels may be selected at a given time by a source node to transmit information to a destination node where $$1 \leq M \leq N. \quad (1)$$

Four well known prior art medium access methods in multi-channel wireless networks are frequency hopping, time division multiple access (TDMA), multiple transceiver, and dedicated control channel approaches.

Random channel selection is the process of selecting channels for communication between nodes arbitrarily, e.g., in a pseudorandom manner, without regard to channel performance. Accordingly, in a random channel selection method there is a high probability of transmission error when one or more channels are disadvantaged. Resultant from lost transmissions is high network latency, increased retransmissions and decreased throughput.

To illustrate these effects, consider that performance of each data channel in a system can be determined by defining the probability of successful transmission of a packet of size P bits in the $i^{th}$ channel in the system as $$\rho_i = (1 - p_{ei})^P \quad (2)$$

where $p_{ei}$ is the probability of bit error for that channel and the bit errors in the packet are assumed to be independent. For example, in the case of Quadrature phase shift keying (QPSK) the probability of bit error for the $i^{th}$ channel can be expressed as $$p_{ei} = Q\left(\sqrt{\frac{2E_b}{I_0}}\right) \quad (3)$$

where $E_b$ is the energy per bit, and $I_o = N_o + J_o$ is the sum of the power spectral densities of the Additive White Gaussian Noise (AWGN) and jamming present in the channel. Each node in a wireless network has a sequence of N probability of successful transmission values corresponding to N data channels. Nodes can select up to M data channels given an M×N selection criterion during a session resulting in K possible combinations of channel selections given by $$K = \binom{N}{M} = \frac{N!}{M!(N-M)!} \quad (4)$$

The probability of successful transmission for the system using M×N random channel selection is then given by $$\rho = \frac{1}{K}(\rho_1 \ldots \rho_M)_i, \, 0 \leq \rho \leq 1 \quad (5)$$

where $(\rho_1 \ldots \rho_m)$ is a combination of M probability of successful transmission values corresponding to selected channels. Equation (5) defines a metric that can be used to compare the performances of different multi-channel selection methods against each other.

To demonstrate the challenge of random channel selection, consider an M×8 wireless network that can have between one and eight disadvantaged channels. Using Equation (5) while varying the number of disadvantaged channels for $1 \leq M \leq 4$, the inefficiency of random selection can be quantified as illustrated in FIG. 1. The results illustrated in FIG. 1 demonstrate that for random channel selection as the number of disadvantaged channels increases, the probability of successful transmission decreases due to an inability to identify and favor high performing channels. As the number of disadvantaged channels increases, the probability of successful transmission decreases. When M>1, the probability of successful transmission decreases rapidly as M becomes larger.

SUMMARY OF THE INVENTION

Embodiments in accordance with the invention provide a state-based channel selection method for establishing a channel state to make selection decisions on M of N or M×N to improve performance in environments where one or more channels are disadvantaged. Generally viewed, embodiments in accordance with the invention distinguish between high performing channels and disadvantaged channels and favor selection of high performing channels. Channels are monitored for performance and placed in channel state vectors have increasing levels of desirability dependent upon the monitored parameters. The higher the state vector the channel is placed in, the more desirable the channel is considered for selection. The channel in the highest state vector is considered for selection first. A channel not in the highest desirable state vector is eligible for selection when a channel is unavailable from higher desirable state vectors. Channels not in the highest desirable state vector, but also not in the lowest undesirable state vector are monitored for improvement to move into higher desirable state vectors as they improve. A channel in the undesirable state vector is not eligible for selection but is monitored for improvement and moved to a desirable state vector once the state-based channel selection method detects improvement in the channel.

Embodiments in accordance with the invention provide a higher probability of successful transmission than the random selection method. Embodiments in accordance with the invention provide a method for dealing with harsh environments to improve the rate of successful transmissions for a multi-channel wireless network.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Figure 2:
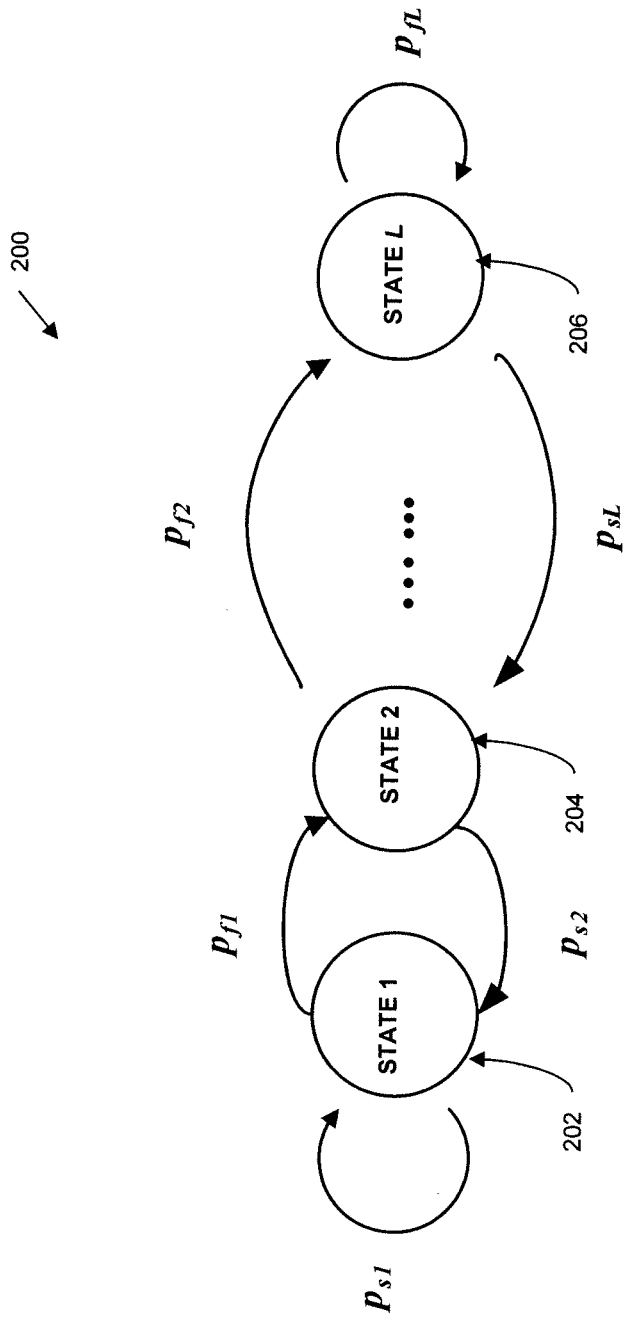
FIG. 2 illustrates a communication channel represented as an L-state Gilbert-Elliot channel depicted as a Markov chain.

As illustrated in FIG. 2, in one embodiment, a communication channel can be represented as an L-state Gilbert-Elliot channel depicted as a Markov chain 200. Each state in Markov chain 200 is illustrated as a circle and can have a selection criterion assigned to it by a method. For example, in FIG. 2, a state 202 represents a state 1, and a state 204 represents a state 2, with states continuing in chain 200 to a state 206 representing a state L. For example, consider a base case scenario where L=2, and the states are defined as good or bad. A binary decision of select channels in the good state and do not select channels in the bad state can be assigned. Channels can transition from state to state dependent on parameters monitored and or metrics assigned. As further described herein, embodiments in accordance with the invention, through the application of N Gilbert-Elliot channels to an N channel wireless network, monitor channel metrics and thresholds to select only channels in desired states while checking channels in less desirable states for performance increases.

Figure 3:
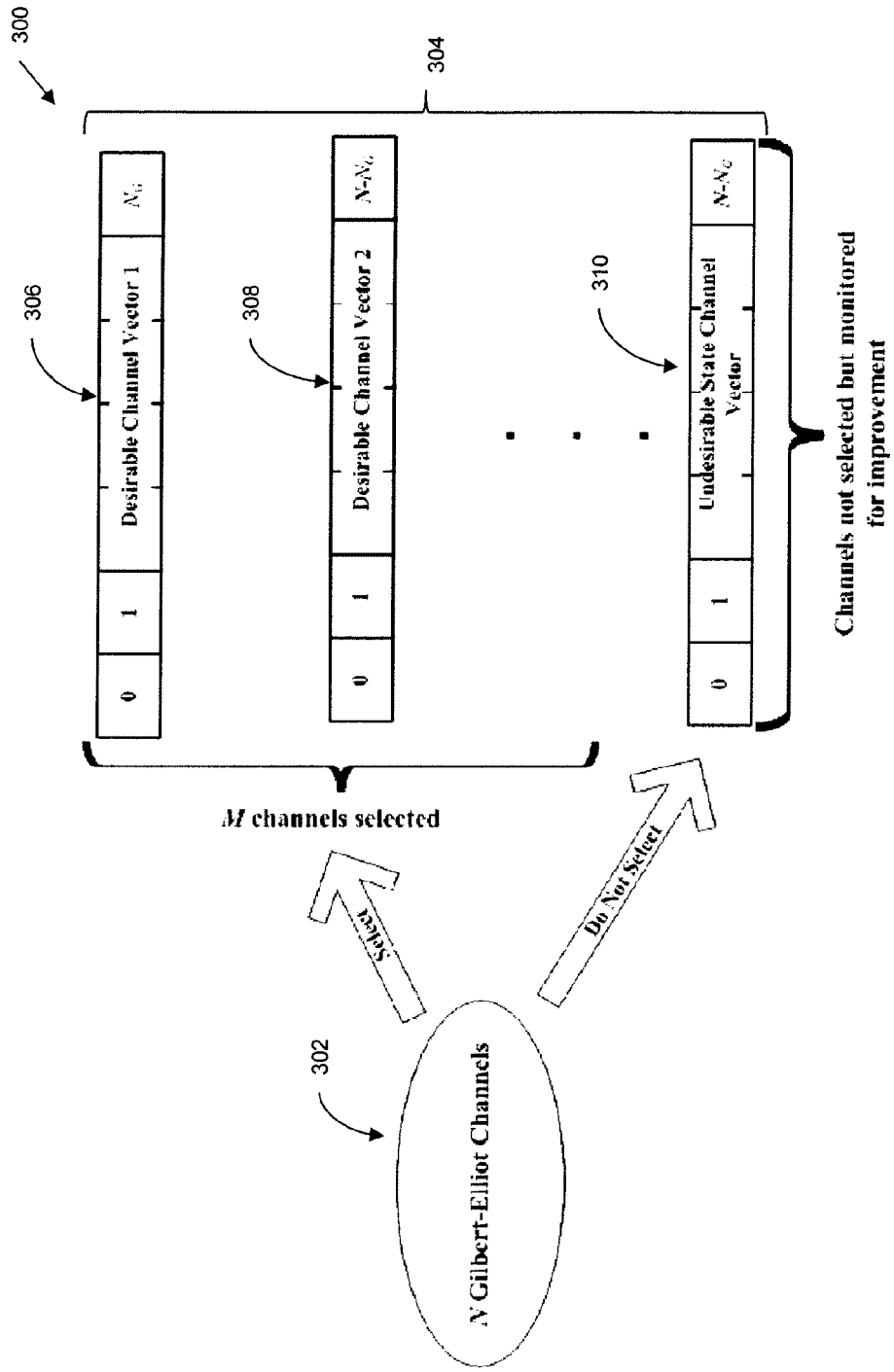
FIG. 3 illustrates placement of channels in either desirable or undesirable vectors in accordance with one embodiment.

FIG. 3 illustrates a state-based channel selection method 300 which discriminates channels based upon historical performance through the application of Gilbert-Elliot channels in accordance with one embodiment. As shown in FIG. 3, in one embodiment, state-based channel selection method 300 places each of a plurality of N Gilbert-Eliot channels 302 in either desirable state vectors or undesirable state vectors and only channels in desirable state vectors are selected. It is assumed each of N channels in a multi-channel wireless network is an independent Gilbert-Elliot channel, e.g., a channel 302, with L states.

In one embodiment, initially, L state vectors 304 corresponding to each possible channel state are created, which can be between zero and $N-N_G$ in length, where $N_G$ is the number of good channels. The lowest channel state vector, shown as vector 310, is identified as the undesirable or "bad" channel state vector while the other vectors, shown as vector 306 and vector 308, are identified as desirable channel state vectors with the highest desirable state vector, vector 306, being referred to as the "good" channel state vector. Each of N Gilbert-Eliot channels 302 are monitored for performance and placed in, e.g., assigned, one of vectors 304 which have increasing levels of desirability dependent upon the monitored parameters. The higher the vector the channel is placed in, the more desirable the channel is considered for selection. Thus, for example, a channel with the most desirable channel performance would be assigned to vector 306, the highest state vector, and a channel with the next most desirable channel performance would be assigned to vector 308, the next highest state vector.

Channel selection decisions in state-based channel selection method 300 are based upon the above described categorization, considering the channel in the highest state vector for selection first. A channel not in the highest desirable state vector is eligible for selection when a channel is unavailable from higher desirable state vectors. Channels not in the highest desirable state vector, but also not in the lowest undesirable state vector are monitored for improvement to move into higher desirable state vectors as they improve. A channel in the undesirable state vector is not eligible for selection but is monitored for improvement and moved to a desirable state vector once the state-based channel selection method detects improvement in the channel.

Figure 4:
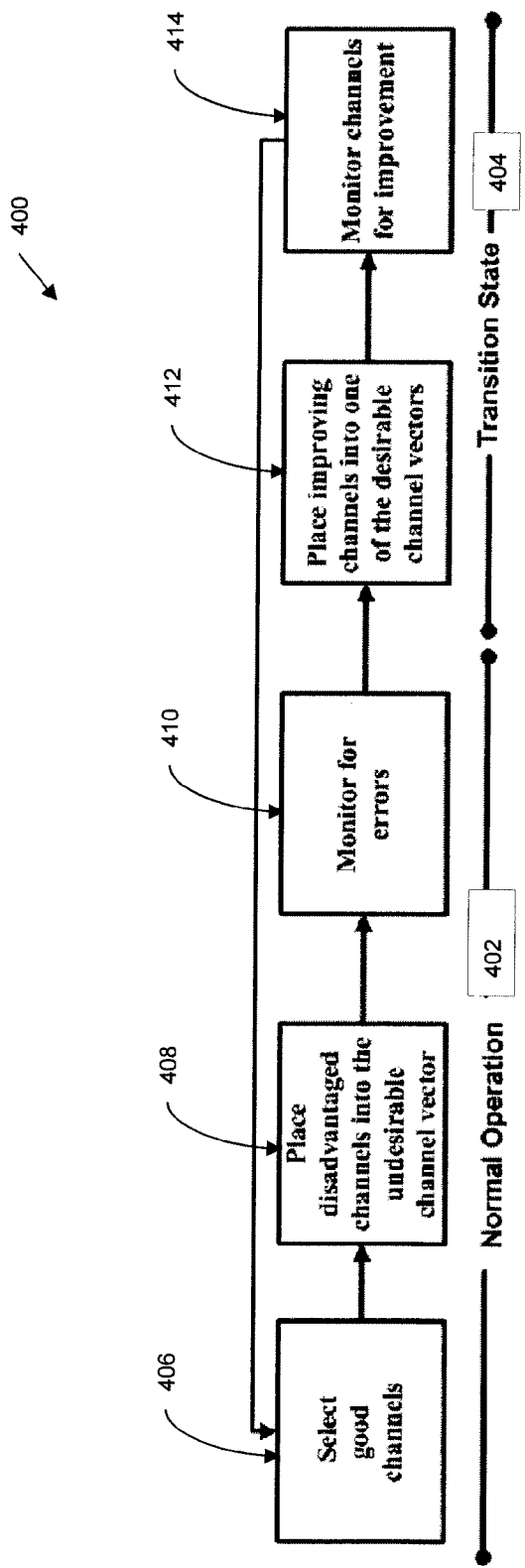
FIG. 4 illustrates a top level interaction of the normal operation state and transition state in accordance with one embodiment.

In one embodiment, the state-based channel selection method has two primary modes of operation, the normal operation mode and the transition state mode. FIG. 4 illustrates a state-based channel selection method top level interaction 400 of a normal operation state mode 402 and a transition state mode 404 in accordance with one embodiment. In normal operation mode 402, state-based channel selection method 400 selects channels randomly from the desirable vectors of good channels, in operation 406; places disadvantaged channels into the undesirable channel vector, in operation 408; and, in operation 410, monitors transmissions for errors. When errors occur in channel I, channel I's desirability is decremented. In transition state mode 404, state-based channel selection method 400 places channels which have improved into higher desirable channel vectors, in operation 412; monitors channels for improvement, in operation 414; and then returns to normal operation mode 402.

Figure 6A:
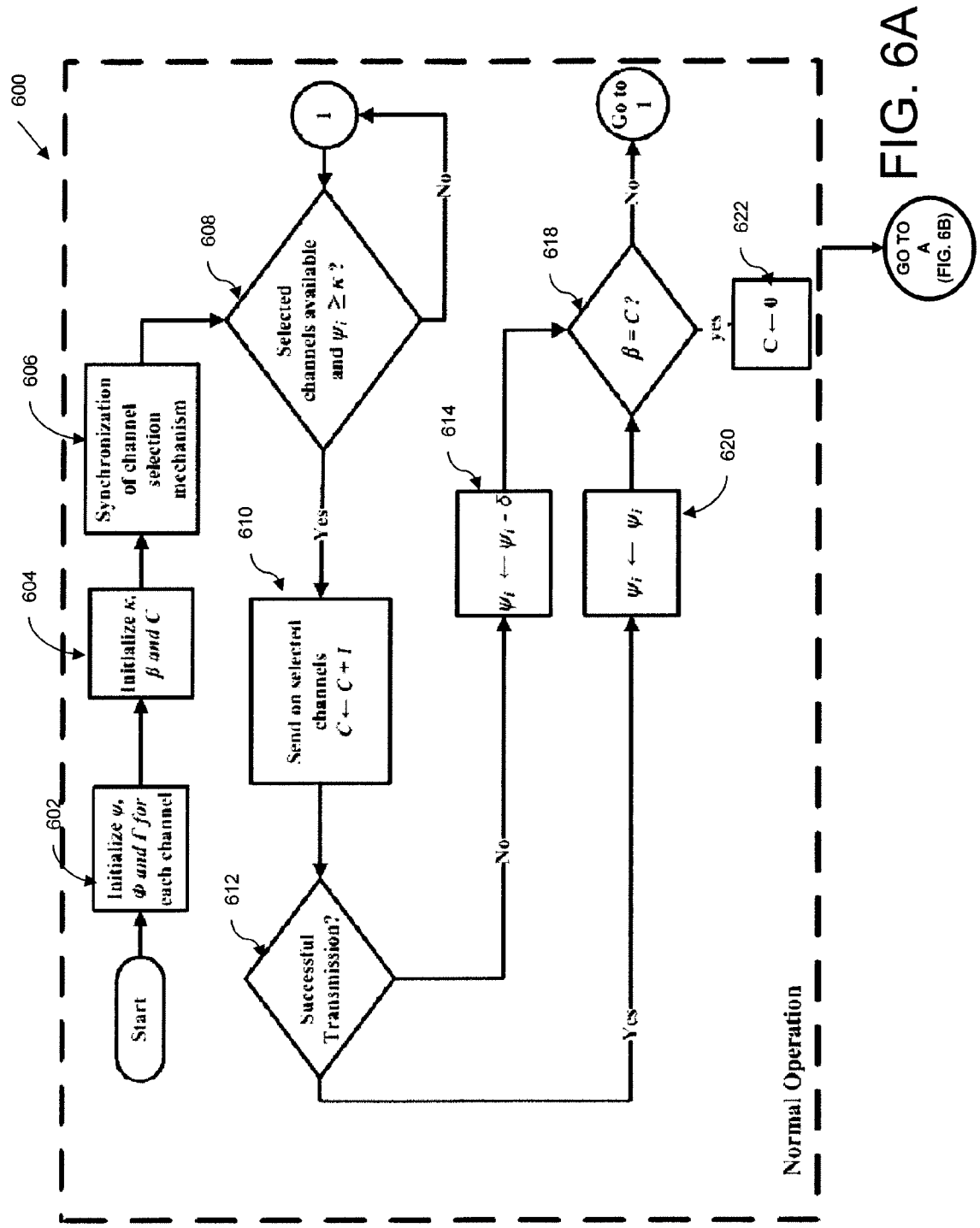
FIGS. 6A and 6B together illustrate a high level process flow diagram of a state-based channel selection method in accordance with one embodiment.
Figure 6B:
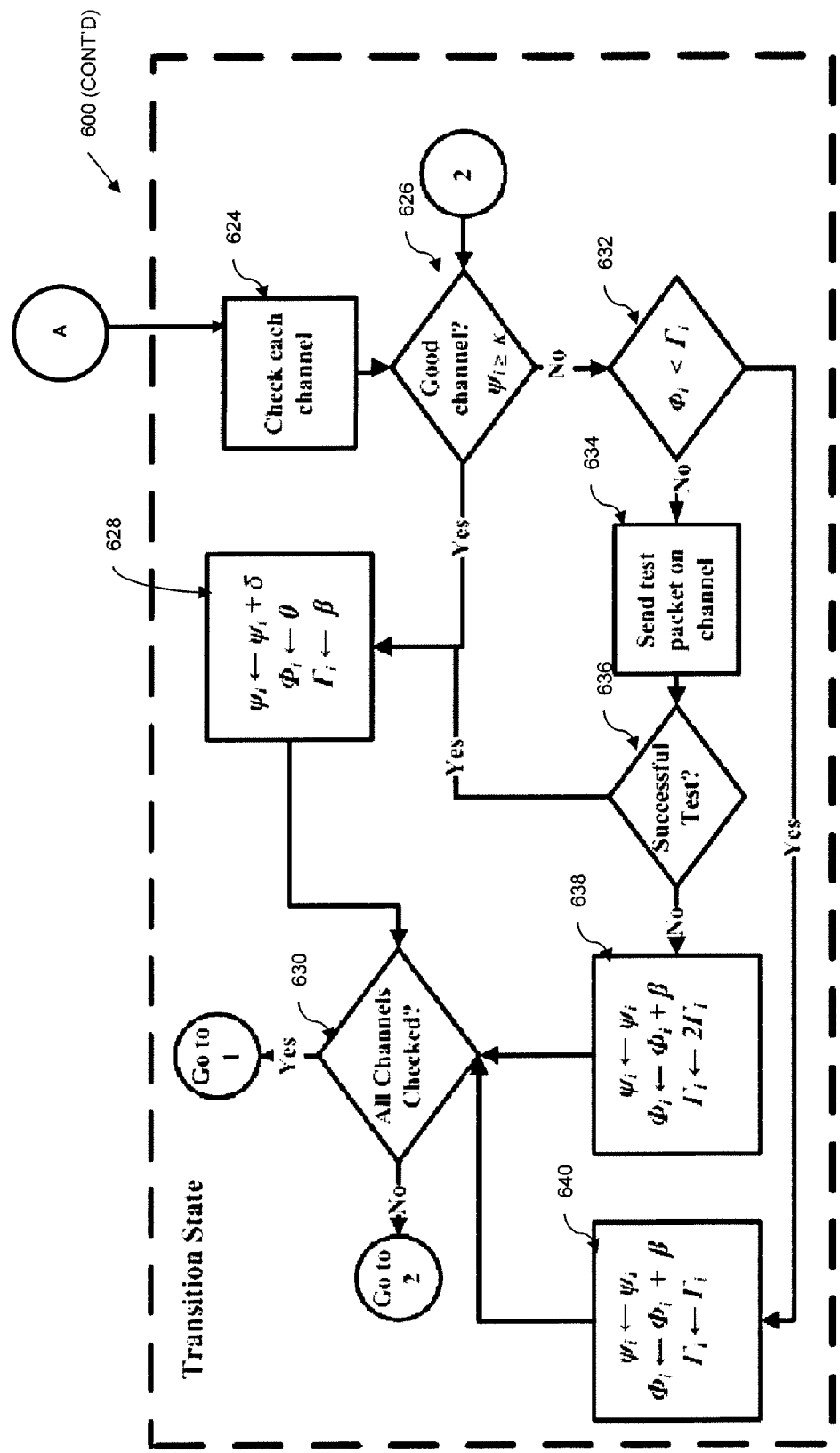

A set of parameters are now introduced to describe one embodiment of the operation of state-based channel selection method 600 further described herein with reference to FIGS. 6A and 6B. An N valued integer sequence defined as the channel quality estimate ψ, with a value corresponding to each of the channels, is initially $\psi_{max}=1$. The channel quality estimate is a running measure of the probability of transmission success for each channel with a range of $$0<\psi_i\leq\psi_{max} \quad (6)$$

Next, a sequence of length L−1 is created termed the channel quality estimate threshold, κ, which can be used to check the state of the channel. The implication of κ is that L states are established which correspond to the possible states or vectors which the channel can be in as shown in FIG. 2. The function of the channel quality estimate threshold, κ, is to indicate which vector to place channels into. Consider the case where L=2, channel i is considered in the highest desirable state (good state) if it satisfies the relationship $$\psi_i \geq \kappa_i. \quad (7)$$

Conversely, channel i is considered to be in the lowest state (bad state) when $$\psi_i < \kappa_i. \quad (8)$$

A parameter, the transition threshold, β, is used to establish the number of transmissions which occur before the state-based channel selection method enters the transition state mode which creates a hysteresis effect, slowing the rate of measured channel improvement. The transition threshold, which is analogous to a period of improvement, does not slow the rate of disadvantaged channels decline in measured performance. These relationships establish stability in the system, by avoiding significant fluctuations in channel state which would negatively impact performance.

Using a special condition for a Markov chain, the state-based channel selection method is modeled. Assuming that the change in time is limited to a small interval, the transitions of a Markov chain can be focused upon, specifically the transition rates of the system. The goal of modeling the system as a Markov chain is to find the limiting state probabilities, which imply that a steady state is reached where one can associate a probability of being in a state at a given time.

Figure 5:
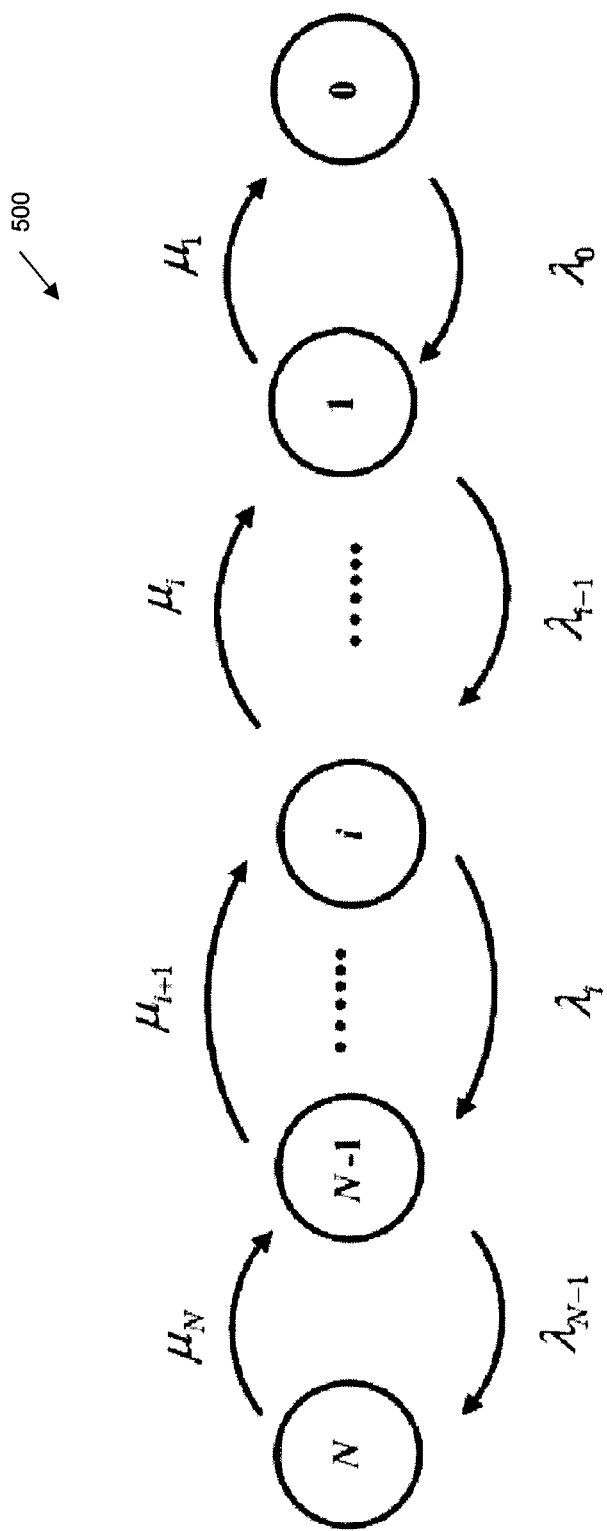
FIG. 5 illustrates a generalized transition rate diagram for the state-based channel selection method in accordance with one embodiment.

FIG. 5 illustrates a generalized transition rate diagram for state-based channel selection. An N channel wireless network can be modeled as an N+1 state Markov chain with the generalized form displayed in FIG. 5. The term is defined as a transition rate to a state in the Markov chain with fewer channels in the good state or as the channel degradation rate. The term $\lambda_i$ is defined as the transition rate to a state with more channels in the good state or as the channel improvement rate. The parameter i in FIG. 5 equals N−1. In one embodiment, the state-based channel selection method begins with the assumption that all channels are in good state by initializing the channel quality estimate to the maximum value $\psi_{max}$.

In normal operation mode, the method decrements the number of channels in the good state as errors are detected, and there is no opportunity for the method to detect improving channels. The implication is that $\mu_i$ represents normal operation because it is the transition rate to a state in the Markov chain with fewer channels considered in the good state. The channel degradation rate is defined as $$\mu_i = \sum_{j=1}^{\binom{N}{i-1}} \prod_{k=1}^{N} \rho_k^{b_{jk}}(1-\rho_k)^{|1-b_{jk}|}, i = N, N-1, \ldots, 2, 1 \quad (9)$$

where $b_{jk}$ is an element of the $$\binom{N}{i-1} \times N$$

array, $B_{i-1}$, of binary combinations of i in an N-bit word where a binary one represents a high performing channel and a zero represents a disadvantaged channel. When N=4 and i=3, the array is given by $$B_2 = \begin{bmatrix} 0 & 0 & 1 & 1 \\ 0 & 1 & 0 & 1 \\ 0 & 1 & 1 & 0 \\ 1 & 0 & 0 & 1 \\ 1 & 0 & 1 & 0 \\ 1 & 1 & 0 & 0 \end{bmatrix} \quad (10)$$

The channel improvement rate is defined as $$\lambda_i = \frac{1}{\beta}\sum_{j=1}^{\binom{N}{i+1}} \prod_{k=1}^{N} \rho_k^{b_{jk}}(1-\rho_k)^{|1-b_{jk}|}, i = 0, 1, \ldots, N-1 \quad (11)$$

where $b_{jk}$ is an element of the $$\binom{N}{i+1} \times N$$

array, $B_{i+1}$, and β is the period at which the method checks for improvement in disadvantaged channels. The requirement to use β in Equation (11) arises to account for the hysteresis effect described in the last section to maintain stability in the system for an improving channel. When N=4 and i=2, the array is given by $$B_3 = \begin{bmatrix} 0 & 1 & 1 & 1 \\ 1 & 0 & 1 & 1 \\ 1 & 1 & 0 & 1 \\ 1 & 1 & 1 & 0 \end{bmatrix} \quad (12)$$

Once steady state conditions are reached in a Markov chain we have $$\sum_{i=0}^{N} p_i = 1 \quad (13)$$

where $p_i$ is the limiting state probability of being in state i.

The limiting state probabilities for a Markov chain can be computed recursively using $$p_{i+1} = \frac{\lambda_i}{\mu_{i+1}} p_i \tag{14}$$

and Equation (13).

From the limiting state probabilities and possible named states between 0 and N the expected number of good channels we define as $N_G$ may be calculated using $$N_G = \lceil E[N_S] \rceil = \left\lceil \sum_{i=0}^{N} i p_i \right\rceil \tag{15}$$

where $N_s$ is defined as the numbered state from the Markov chain and $\lceil . \rceil$ represents the ceiling function.

Each node can select up to M data channels which results in K possible combinations of channel selections for random selection. In the state-based channel selection method, the channels that can be selected is limited to $N_G$, the number of desirable channels in a given state of the Markov chain. Therefore, the number of possible combinations of channel selections for a given state of the Markov chain in a M×N system is defined as $$K_G = \binom{N_G}{M} = \frac{N_G!}{M!(N_G - M)!} \tag{16}$$

Each state of the Markov chain has a number of channels it considers in the good state, so each state has its own mutually exclusive probability of successful transmission. Given an M×N channel selection system for each state in the Markov chain there is a probability of successful transmission for a given state j in the Markov chain referred to as $\tau_j$ defined as $$\tau_j = \begin{cases} \frac{1}{K} \sum_{i=1}^{H} (\rho_1 \ldots \rho_M)_i, & \text{for } j = 0, N \\ \frac{1}{K_G} \sum_{i=1}^{K_G} (\rho_1 \ldots \rho_M)_i, & \text{for } j \neq 0, N \end{cases} \quad 0 \leq \tau_j \leq 1. \tag{17}$$

where $(\rho_1 \ldots \rho_M)$ is a random combination of M probability of successful transmission values corresponding to the set of good channels in a given state.

In the current embodiment, the state-based channel selection method incurs overhead defined as $\Omega$, resultant from checking if channels are improving when test packets are sent in the transition state. The parameter $N_B$ is defined as the number of bad channels, and the method enters the transition state mode at a frequency of $1/\beta$ with $N_B$ bad channels at that time. In the best case, no packets are sent because all channels are in a good state when $N_B=0$. In the worst case, a test packet must be sent for every channel in the bad state assuming $N_B=N$. Due to these relationships, the range of overhead is defined as $$0 \leq \Omega \leq \frac{N_B}{\beta}. \tag{18}$$

Combining the results of Equations (14), (17) and (18) the rate of successful transmission by a node with N data channels for the state-based method is given by $$\sum_{i=0}^{N} p_i \tau_i - \Omega \leq \rho \leq \sum_{i=0}^{N} p_i \tau_i \quad 0 \leq \rho \leq 1. \tag{19}$$

Equation (19) represents the sum the product of the limiting state probabilities with the performance of the method in the respective state with the overhead subtracted from the result. In the worst case, $\Omega = N_B/\beta$ is subtracted from $\rho$, and in the best case $\Omega=0$ is subtracted from $\rho$.

Implementation of the state-based channel selection method requires establishing method parameters to the appropriate ranges to make it practical and to limit overhead which reduces overall performance. The transition threshold is set to the range $$\beta_L \leq \beta \leq \beta_U \tag{20}$$

where $\beta_L$ is the lower bound of the transition threshold to ensure that the method operates long enough to identify disadvantaged channels and $\beta_U$ is the upper bound established to prevent the method from starving out improving channels. In conjunction with $\beta$, a parameter, the dynamic counter C, is initially set to zero. At the conclusion of each session, C is incremented by an integer value of one until $\beta=C$, at which time the method enters the transition state where it can check for improvements in channels. Upon exiting the transition state, C is set back to zero. These relationships imply that that the dynamic counter is in the range $$0 \leq C \leq B \tag{21}$$

To limit overhead a new parameter, the improvement counter, $\Phi$, is an N member sequence which keeps track of the number of sessions for each channel since that channel's quality estimate last improved by an integer value of one. The improvement counter is initialized to zero for the each of N channels. Then $\Phi_i$ is incremented by one if the channel quality estimate $\psi_i$ does not improve for a session during operation. If the channel quality estimate $\psi_i$ does improve, the improvement counter is reset back to zero. Given that the number of sessions is Z, the improvement counter for a channel i takes values in the range $$0 \leq \Phi_i \leq Z. \tag{22}$$

To limit overhead working in conjunction with the improvement counter is an exponential back off timer $\Gamma_i$. The exponential back off timer is initialized to the value of the transition threshold ($\beta$) and is used to limit the number of test packets sent when monitoring disadvantaged channels for performance increases. When a channel improves $\Gamma_i$ is set back to the value of the transition threshold. However, if a channel does not improve over a period of time the exponential back off timer increases exponentially. The exponential back off timer takes the range $$\beta \leq \Gamma_i \leq 2^{n_i} \beta \tag{23}$$

where $n_i$ is the number of times the channel has entered the transition state without improvement in the channel's channel quality estimate given by $$n_i = \frac{\Phi_i}{\beta}. \quad (24)$$

The parameter $n_i$ should be limited to a finite value because a channel can rapidly be starved out of use if it remains in a bad state for a long duration since the back off timer is exponential. At the conclusion of the initialization, network nodes must synchronize medium access using frequency hopping, TDMA, a multiple transceiver, or a dedicated control channel approach.

Normal operation mode is the mode of operation where communication between nodes takes place and the channel quality estimate $\psi_i$ is decremented when transmission errors occur. Once M selected available channels from the good channel vector are selected, transmission between nodes occurs. If the session fails to complete successfully, then the channel quality estimate for channel i, $\psi_i$ is decremented by $\delta$ which is the change in channel quality estimate established in the method. If the session is successful, then the channel quality estimate stays at the same integer value it held prior to the session. If there are fewer channels in the desirable channel vectors than the number of selected channels M, then channels are randomly selected from the bad channel vector.

The process of channel negotiation between nodes continues iteratively, consistent with the node coordination process. When a channel has experienced enough failed transmissions and the channel quality estimate falls below the channel quality estimate threshold, channel i is moved into increasingly lower desirable channel vectors until it reaches the lowest channel vector, i.e., the bad channel vector, at which time it is no longer eligible for channel selection. At the conclusion of each session, the dynamic counter is incremented by an integer value of one and the process iteratively continues beginning with checking for available channels in the good channel vector. Normal operation mode ends when the transition threshold and the dynamic counter are equal and the method enters the transition state mode.

The transition state mode is the mode of operation where channels are tested for improvement. Once in the transition state mode, the dynamic counter is set back to zero. To limit overhead, channels currently in a good state have their channel quality estimate updated by rather than sending a test packet to check for improvement on a good channel. For these channels, the values of $\psi_i$, $\Phi_i$ and $\Gamma_i$ are updated as follows $$\psi_i(s+1) = \psi_i(s) + \delta, \psi_i \leq \psi_{max}$$

$$\Gamma_i(s+1) = \beta$$

$$\Phi_i(s+1) = 0 \quad (25)$$

where s is the session number and where $\delta$ is the change in channel quality estimate. The should not be incremented above $\omega_{max}$ regardless of performance to protect a channel from accumulating large of a channel quality estimate. Channels that are in an undesirable or bad state ($\psi_i < \kappa_i$) and with $$\Phi_i(s) < \Gamma_i(s) \quad (26)$$

keep their current channel quality estimate and are not checked for improvement. For these channels the values of $\psi_i$, $\Phi_i$ and $\Gamma_i$ are updated as follows $$\psi_i(s+1) = \psi_i(s)$$

$$\Gamma_i(s+1) = \Gamma_i(s)$$

$$\Phi_i(s+1) = \Phi_i(s) + \beta \quad (27)$$

Channels that are in a bad state and with $$\Gamma_i(s) \geq \Phi_i(s) \quad (28)$$

have a test packet sent to check for improvement through the successful transmission of the packet. Upon confirming a successful transmission in the channel values of $\psi_i$, $\Phi_i$ and $\Gamma_i$ for these channels are updated using Equation (25). If the test packet is unsuccessfully received the values of $\psi_i$, $\Phi_i$ and $\Gamma_i$ for these channels are updated using the following relationship $$\psi_i(s+1) = \psi_i(s)$$

$$\Gamma_i(s+1) = 2\Gamma_i(s)$$

$$\Phi_i(s+1) = \Phi_i(s) + \beta \quad (29)$$

The method then leaves the transition state mode and returns to normal operation mode. The process of iteratively fluctuating between the normal operation mode and the transition state mode continues for the duration of network operation.

The state-based channel selection method described above can be represented by process flow chart as further detailed with reference to FIGS. 6A and 6B. FIGS. 6A and 6B together illustrate a high level process flow diagram of a state-based channel selection method 600 in accordance with one embodiment.

Referring now to FIG. 6A, in operation 602, the channel quality estimate, $\psi_i$, the improvement counter, $\Phi$, and the exponential back off timer, $\Gamma_i$, are initialized for each channel. In one embodiment, the channel quality estimate $\psi_i$, with a value corresponding to each of the channels, is initialized to $\psi_{max} = 1$; the improvement counter $\Phi$ is initialized to zero for the each of N channels; and the exponential back off timer is initialized to the value of the transition threshold ($\beta$). Processing continues from operation 602 to operation 604.

Figure 7:
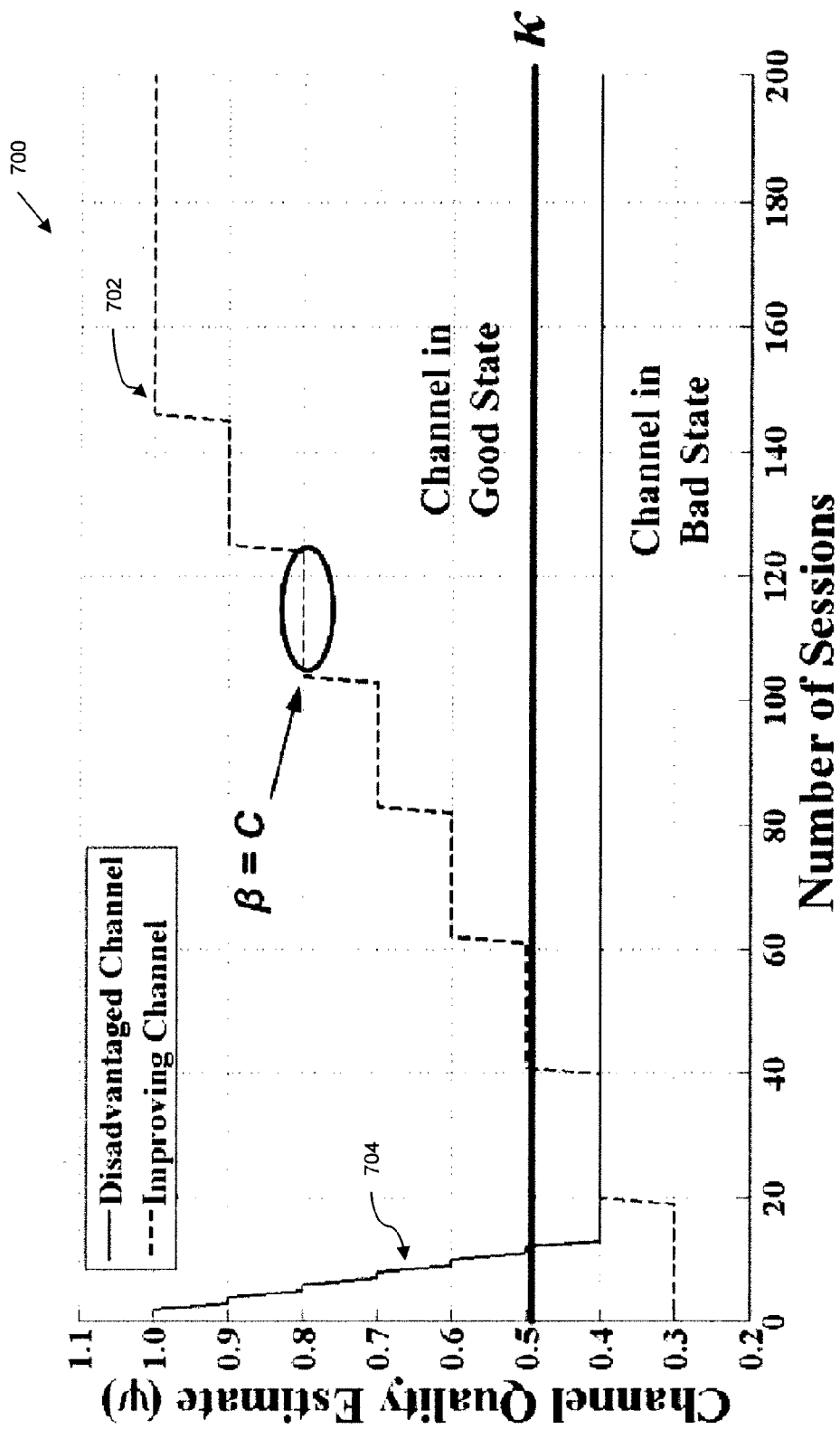
FIG. 7 illustrates a state-based channel behavior obtained from simulations in accordance with one embodiment.
Figure 8:
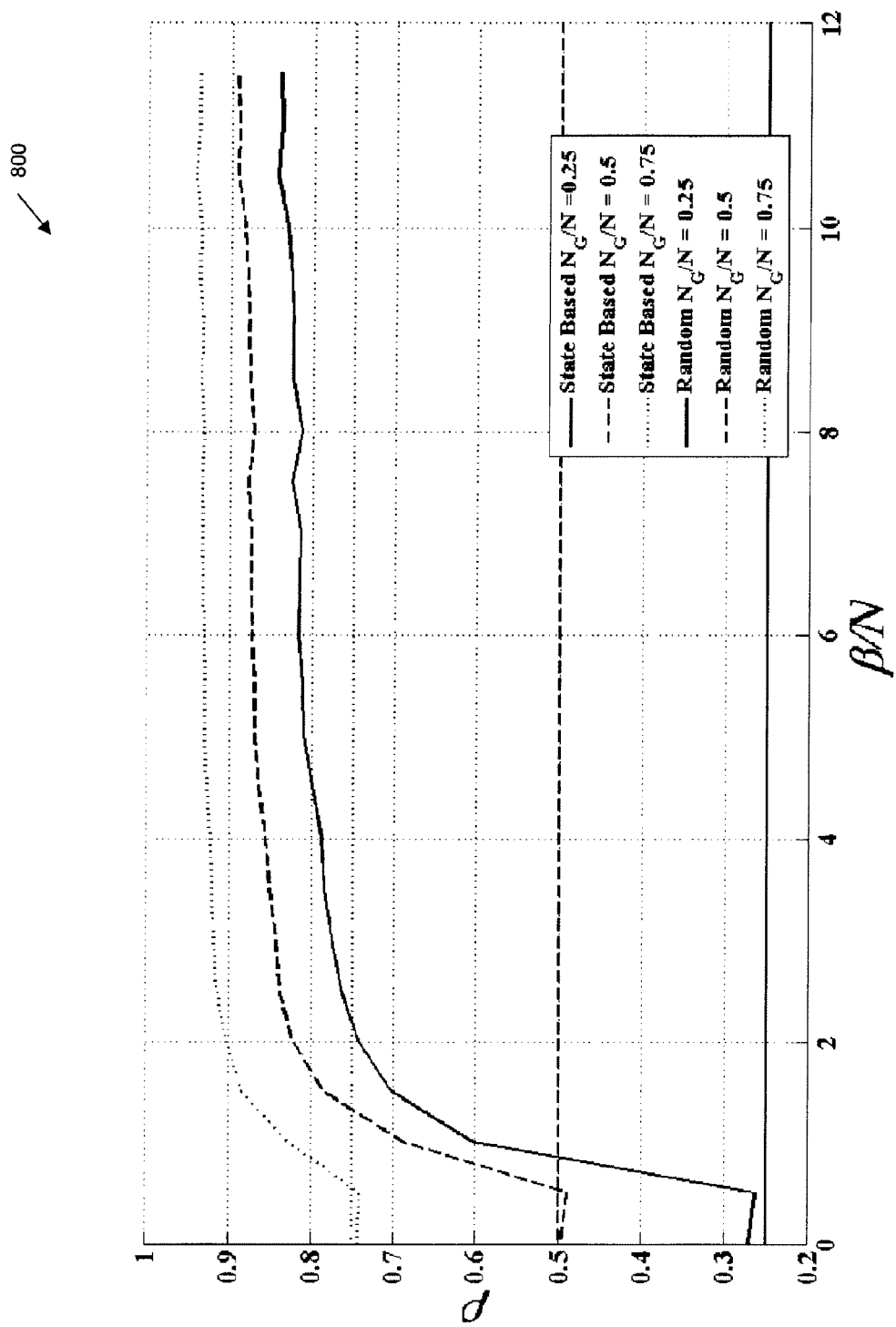
FIG. 8 illustrates the effect of varying β on ρ for a 1×50 channel system with respective $N_G/N$ values of 0.25, 0.5, and 0.75 for state-based selection and random selection in accordance with one embodiment.

In operation 604, the channel quality estimate threshold, $\kappa$, the transition threshold, $\beta$, and the dynamic counter C are initialized. In one embodiment, the channel quality estimate threshold, $\kappa$, is initialized to a value where $0 < \kappa < 1$; the transition threshold, $\beta$, is initialized to a value where $0 < \beta <$ number of sessions; and the dynamic counter C is initialized to zero (0). In one embodiment, $\beta$ can be initialized to a value where $2N < \beta < 10N$, where N is the number of channels in a system. For example, referring to FIG. 7, the channel quality estimate threshold, $\kappa$, was initialized to 0.5 and the transition threshold, $\beta$, was initialized to 20 in a 3 channel system which falls within the above criteria; improvement is seen in the good channel and rapid degradation in the bad channel. Different performance will occur based on the threshold choices for the values of $\kappa$ and $\beta$. Depending on the desired implementation and the number of channels in a system, the values of $\kappa$ and $\beta$ can be varied to achieve a desired performance level. The parametric curves shown in FIG. 8 illustrate this. Processing continues from operation 604 to operation 606.

At the conclusion of initialization operation 604, in operation 606, the channel selection mechanism is synchronized and a channel selected for use. For example, as earlier described, in one embodiment, the network nodes must synchronize medium access using frequency hopping, TDMA, a multiple transceiver, or a dedicated control channel approach.

In decision operation 608, a determination is made whether a selected channel is available for use and $\psi_i \geq \kappa_i$.

Upon a determination that both conditions are not met, "NO", processing returns to operation 608 with another channel selected.

Alternatively, upon a determination that both conditions are met, i.e., the selected channel is available for use and $\psi_i \geq \kappa_i$, "YES", processing continues to operation 610.

In operation 610, a communication is sent on the selected channel, the dynamic counter C is incremented by 1, and processing continues to decision operation 612.

In decision operation 612, a determination is made whether the transmission session on the selected channel was successful. In one embodiment, this determination is made based on any returned errors.

Upon a determination that the transmission was not successful, "NO", processing continues to operation 614.

In operation 614, if the session fails to complete successfully, then the channel quality estimate for the channel, $\psi_i$ is decremented by $\delta$ which is the change in channel quality estimate, with processing continuing to decision operation 618.

Referring back again to operation 612, alternatively, if the session completes successfully, "YES", processing continues to operation 620.

In operation 620, the channel quality estimate, $\psi_i$ for the channel stays at the same integer value it held prior to the session and processing continues to operation 618.

In decision operation 618, a determination is made whether the transition threshold, $\beta$, equals the dynamic counter C, i.e., whether $\beta = C$.

Upon a determination that $\beta \neq C$, "NO", processing returns to operation 608 and processing continues as earlier described. In this way at the conclusion of each session, the dynamic counter C is incremented by 1 and the process iteratively continues beginning with checking for available channels in the good channel vector.

Alternatively, upon a determination that $\beta = C$, "YES", normal operation mode ends and method 600 enters the transition state mode with processing entering the transition state mode at operation 622.

In operation 622, the dynamic counter C is reset to zero (0) and method 600 exits from the normal operation mode and enters the transition state mode in which checks for improvements in channels are made.

Referring now to FIG. 6B and operation 624, in operation 624, each N channel is checked for performance and processing continues to decision operation 626.

In decision operation 626, a determination is made whether a selected channel is a good channel. More particularly, a determination is made whether $\psi_i \geq \kappa_i$.

Upon a determination that $\psi_i \geq \kappa_i$, "YES", the channel is considered in the highest desirable state (good state) and processing continues to operation 628.

Alternatively, upon a determination that $\psi_i < \kappa_i$, "NO", the channel is considered to be in the lowest state (bad state) and processing continues to operation 632.

Referring now to operation 628, when a channel is in the desirable state, in operation 628, the channel quality estimate, $\psi_i$, the improvement counter, $\Phi$, and the exponential back off timer, $\Gamma_i$, are updated for the channel. In particular, the channel quality estimate, $\psi_i$ is updated to $\psi_i + \delta$, the improvement counter, $\Phi$, is updated to $\Phi_i = 0$ and the exponential back off timer, $\Gamma_i$, is updated to $\Gamma_i = \beta$, and processing continues to decision operation 630.

In decision operation 630, a determination is made whether all channels have been checked.

Upon a determination that all channels have been checked "YES", processing leaves the transition state mode and returns to the normal operation mode with processing returning to operation 608 (FIG. 6A).

Alternatively, upon a determination that all channels have not been checked "NO", processing returns to operation 626 as earlier described.

Returning now to operation 626, upon a determination that a channel was not a desirable (good) channel, processing continues to decision operation 632.

In decision operation 632, a determination is made whether the improvement counter is less than the exponential back off timer, $\Phi_i < \Gamma_i$.

Upon a determination that $\Phi_i < \Gamma_i$, "YES", processing continues to operation 640.

In operation 640, the channel quality estimate, $\psi_i$, the improvement counter, $\Phi$, and the exponential back off timer, $\Gamma_i$, are updated for the channel. In particular, the channel quality estimate, $\psi_i$ and the exponential back off timer, $\Gamma_i$, retain the existing value, and the improvement counter, $\Phi$, is updated to $\Phi_i = \Phi_i + \beta$, and processing continues to decision operation 630 as earlier described.

Referring again to decision operation 632, alternatively, upon a determination that $\Phi_i \geq \Gamma_i$, "NO", processing continues to operation 634.

In operation 634, a test packet is sent over the channel, and processing continues to decision operation 636.

In decision operation 636, a determination is made whether the test packet transmission was successful.

Upon a determination the test packet transmission was not successful, "NO", processing continues to operation 638.

In operation 638, the channel quality estimate, $\psi_i$, the improvement counter, $\Phi$, and the exponential back off timer, $\Gamma_i$, are updated for the channel. In particular, the channel quality estimate, $\psi_i$, retains the existing value, the improvement counter, $\Phi$, is updated to $\Phi_i = \Phi_i + \beta$, and the exponential back off timer, $\Gamma_i$ is updated to $\Gamma_i = 2\Gamma_i$ and processing continues to decision operation 630 as earlier described.

Referring back again to decision operation 636, alternatively, if the test packet transmission was successful, processing continues top operation 628 as earlier described.

MATLAB and QualNet simulations were developed to demonstrate the effectiveness of the state-based channel selection method. Each of the transmission channels is a Rayleigh fading channel to be consistent with what would be expected in mobile wireless networks with a harsh electromagnetic environment. For the purposes of simulation, disadvantaged channels were assumed to have $p_i = 0.001$ and high performing channels $p_i = 0.999$. Results are obtained through Monte Carlo simulations, repeating 1000 times.

First a simulation was created to demonstrate the behavior of a state-based channel. It was assumed L=2 naming the desirable state the good state and undesirable state the bad state with $\kappa = 0.5$. In the simulations $\psi_{max} = 1.0$ and $\delta = 0.1$. When $\psi_i > \kappa$ the channel is in a good state and alternatively when $\psi_i < \kappa$ the channel is in a bad state as presented in FIG. 7. FIG. 7 illustrates a graph 700 of state-based channel behavior obtained from simulations in accordance with one embodiment. The disadvantaged channel, curve 704, rapidly decrements $\psi_i$ each time it is selected, resulting in a steep drop. The improving channel, curve 702, slowly increments $\psi$ at a rate established by $\beta$ represented by the horizontal sections of the curve.

Recall that the value of $\beta$ is the period at which state-based selection enters the transition state mode and ultimately how often the method can check for improving channels which creates a hysteresis effect and stability in the system. A simulation was created to find an appropriate range for the transition threshold to meet the requirements established in Equation (20). To simulate the effect of varying $\beta$ on state-based channel selection, three scenarios were established for a 50 channel system by setting $N_G/N$ equal to 0.25, 0.5 and 0.75, respectively. A 50 channel system was selected to create a scenario where the transition threshold could be varied within a range to test the limits of the method. The probability of successful transmission was measured by varying β between zero and six hundred for both state-based and random channel selection. Simulation results are obtained for a 1×50 system for the base case which closely match the results where M>1.

FIG. 8 illustrates a graph 800 of the effect of varying the transition threshold β on ρ for a 1×50 channel system with respective $N_G/N$ values of 0.25, 0.5, and 0.75 for state-based selection (solid curves) and random selection (dotted lines). The x-axis has been normalized by dividing β by N. At low values of β/N, the probability of successful transmission is about the same for both state-based (solid curves) and random (dotted lines) selection. The probability of successful transmission approaches its maximum value at around β/N≥2. The results begin to flatten around β/N≥10. These results indicate that the transition threshold should be limited to the range $$2N \leq \beta \leq 10N \quad (30)$$

to maximize the performance of state-based channel selection.

The transmission of test packets to monitor for improvement in channels in the bad state leads to overhead in the system. The overhead in the wireless network increases proportionally to the number of bad channels resulting in a slightly lower probability of successful transmission which the method should limit. The effect of overhead can be limited by selecting an appropriate value of the transition threshold.

Figure 9:
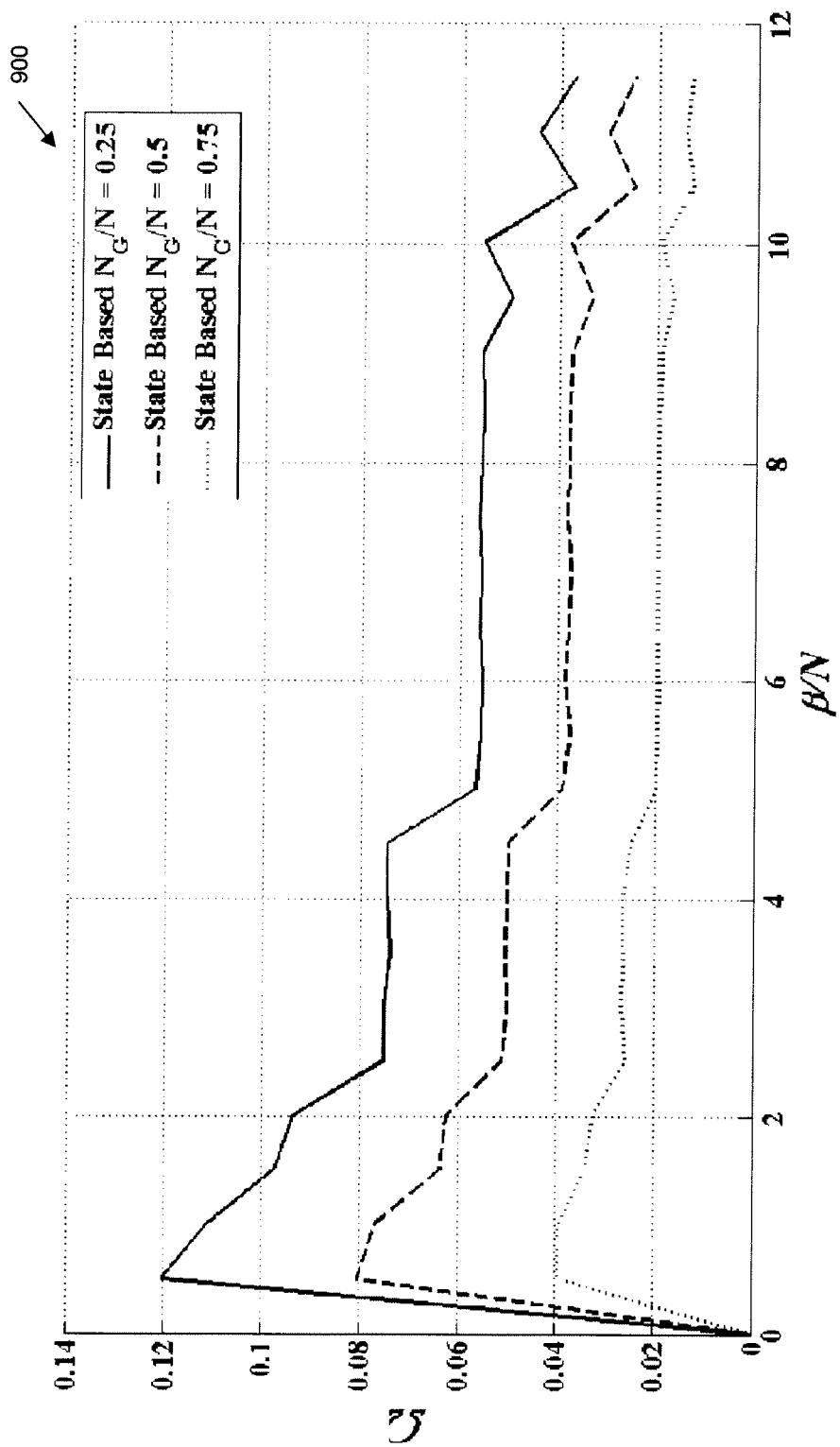
FIG. 9 illustrates the effect of varying β on Ω for a 1×50 channel system with respective $N_G/N$ values of 0.25, 0.5, and 0.75 for state-based channel selection in accordance with one embodiment.

FIG. 9 illustrates a graph 900 of the effect of varying the transition threshold β on the system overhead Ω for a 1×50 channel system with respective $N_G/N$ values of 0.25, 0.5, and 0.75 for state-based selection. At low values of β/N overhead is larger and for β/N>5, overhead decreases. As $N_G/N$ increases overhead decreases because as there are more good channels in the wireless network less test packets are sent to check for improvements in bad channels.

Next was simulated the effect on the probability of successful transmission of varying M between one and four in an M×8 selection system while increasing the number of disadvantaged channels from zero to eight. For the eight channel system β=40 agreeing with the relationship established in Equation (30) to increase the probability of successful transmission and limit overhead. Referring back again to FIG. 1, simulation results represented by the discrete points (i.e., simulation values) are the relative performances of a system using random selection as M is varied. These results validated through simulation that random selection is suboptimal when a subset of channels are disadvantaged.

Figure 1:
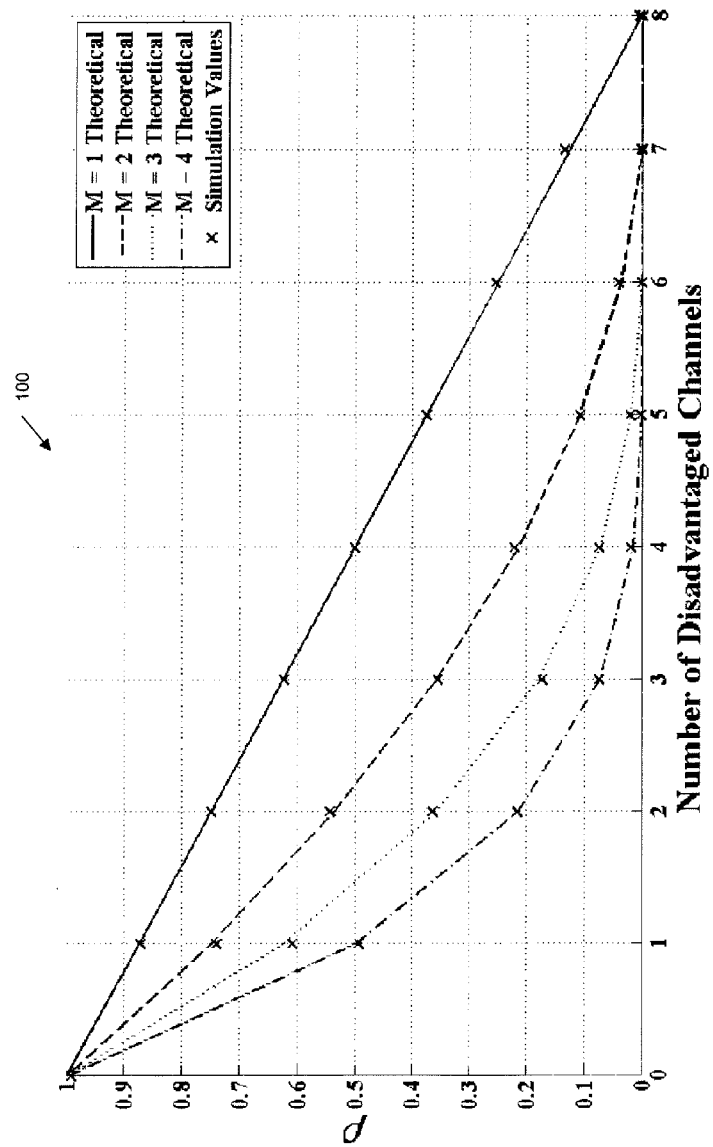
FIG. 1 illustrates the theoretical and simulation results of an M×8 system using prior art random channel selection for $1 \leq M \leq 4$.
Figure 10:
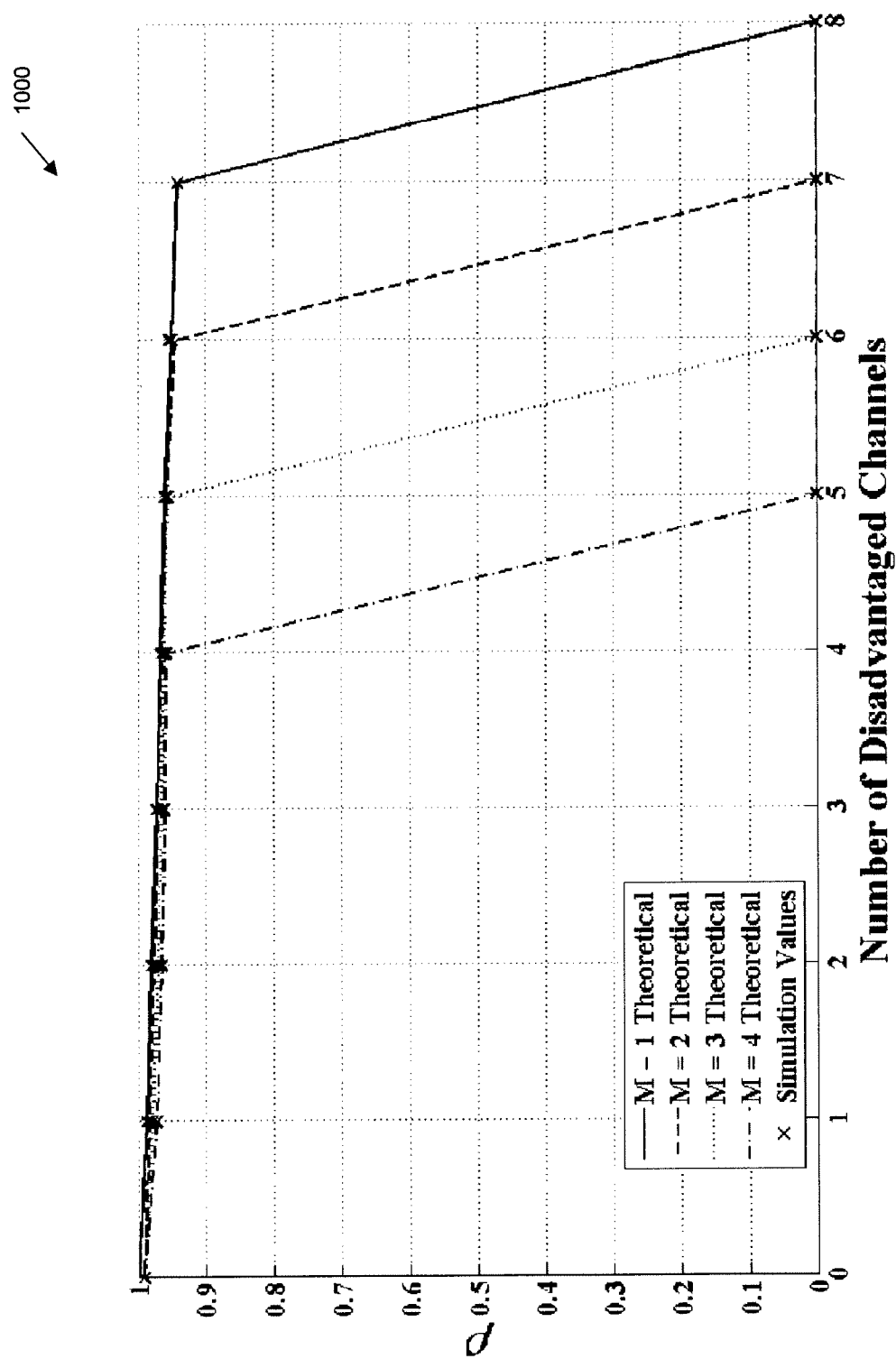
FIG. 10 illustrates a comparison of simulation to theoretical results of an M×8 system using state-based selection for $1 \leq M \leq 4$ in accordance with one embodiment.

FIG. 10 illustrates a graph 1000 of the simulated and theoretical performance of state-based channel selection for 1≤M≤4 as the number of disadvantaged channels are varied. In state-based channel selection, the probability of successful transmission stays consistently high when a subset of channels is disadvantaged, whereas in random selection the probability of successful transmission rapidly decreases. This result is confirmed by comparing FIG. 1 and FIG. 10 illustrating that state-based channel selection successfully favors high performing channels resulting in an increased probability of successful transmission. A sharp decline in performance occurs in state-based channel selection when M>$N_G$ because when there are fewer channels in the good state vector than necessary for a successful transmission and therefore the method randomly selects disadvantaged channels from the bad channel vector, thus reducing performance.

Figure 11:
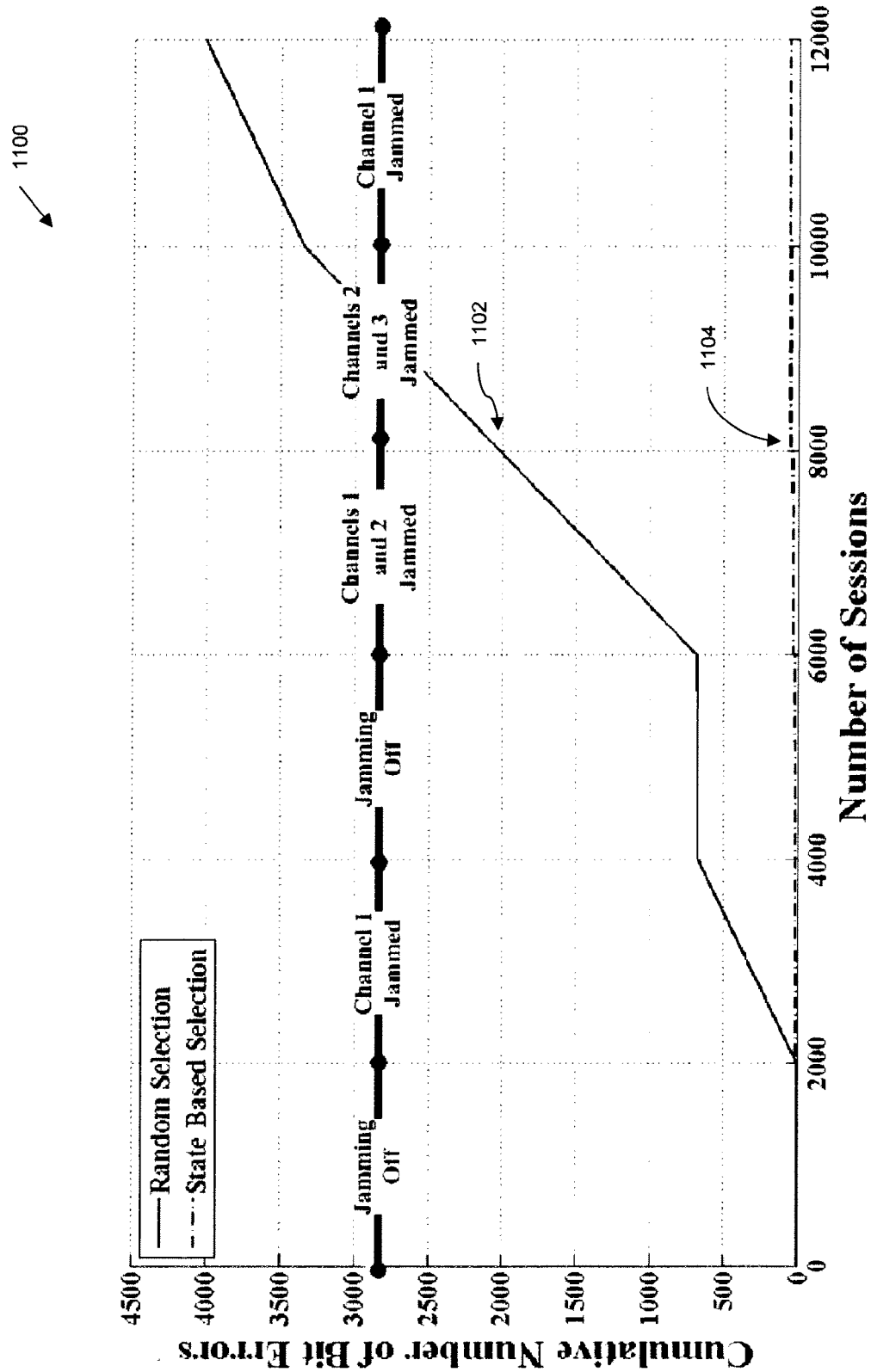
FIG. 11 illustrates the cumulative bit errors over time as jamming rotates between channels in accordance with one embodiment.

Next, the effect of jamming on a 1×3 system as a jammer rotates through a subset of channels that are jammed was explored. This situation is consistent with either mobile environments where the availability of channels may change over time or in scenarios where a reactive multiple tone jammer may selectively choose jamming patterns. FIG. 11 illustrates a graph 1100 of simulation results over six intervals of 2000 sessions and the cumulative bit errors over time as jamming rotates between channels. For each interval, the slope of the respective curve compares the relative performance of each method. For intervals where jamming is off, the random selection curve 1102 performs comparably to state-based selection curve 1104. Beginning at sessions 2001, 6001 and 8001, it can be seen that the subset of jammed channels are rotated, and state-based selection has a slight increase in accumulated bit errors but rapidly returns to nearly a slope of zero. Random selection begins accumulating errors at a larger rate (larger positive slope) when channels are jammed.

As earlier stated, the simulations presented above represent the case where L=2 states for the channels. Though results for L≥3 are not shown the results should be similar as the method favors the selection of the highest performing channels.

Thus has been described a novel state-based channel selection method for selecting high performing channels in an M×N multi-channel wireless network, demonstrating increased network performance. The state-based channel selection method has applicability to operations in tactical, emergency response or other multi-channel networks in harsh environments when one or more channels are disadvantaged.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A state-based channel selection method for selecting a channel in a multi-channel wireless network having a plurality of N channels comprising:
    a) for each channel in said plurality of N channels, initializing a channel quality estimate $\psi_i$, an improvement counter Φ, and an exponential back off timer Γ wherein said channel quality estimate $\psi_i$ is initialized to ψ=1, said improvement counter Φ is initialized to zero, and said exponential back off timer Γ; is initialized to a value of a transition threshold β;
    b) initializing a channel quality estimate threshold κ, a transition threshold β, and a dynamic counter C wherein said channel quality estimate threshold κ is initialized to a value where 0<κ<1, said transition threshold β is initialized to a value where 0<β<number of sessions, and said dynamic counter C is initialized to zero (0);
    c) synchronizing a channel selection mechanism wherein network nodes in said communication network synchronize medium access using a selected channel selection mechanism;
    d) selecting a channel for use in transmission from said plurality of N channels, said channel being a selected channel;
    e) determining whether said selected channel is available for use and ψ≥κ;
    f) upon a determination that said selected channel is not available for use or ψ≥κ is not met, returning to operation d) and selecting a next channel;

g) alternatively, upon a determination that said selected channel is available for use and $\psi \geq \kappa$, sending a transmission on said selected channel and incrementing said dynamic counter C by 1;

h) determining whether said transmission on said selected channel was successful, wherein said determining whether said transmission on said selected channel was successful is based upon returned errors, if any;

i) upon a determination that said transmission was not successful, decrementing said channel quality estimate $\psi$ for said selected channel by a change in channel quality estimate $\delta$;

j) alternatively, upon a determination said transmission was successful, retaining said channel quality estimate $\psi$ for said selected channel at a same integer value held prior to said transmission;

k) determining whether said transition threshold $\beta$ equals said dynamic counter C ($\beta = C$);

l) upon a determination that said transition threshold $\beta$ does not equal said dynamic counter C, returning to operation d) and selecting a next channel;

m) alternatively, upon a determination that $\beta = C$, resetting said dynamic counter C to zero (0);

n) selecting a channel to check for performance from said plurality of N channels, said channel being a selected check channel;

o) determining whether said selected check channel is a good channel based on whether $\psi \geq \kappa$;

p) upon a determination that $\psi \geq \kappa$, for said selected check channel, determining said selected check channel is a good channel in a good vector state and updating the channel quality estimate, $\psi_i$, the improvement counter, $\Phi$, and the exponential back off timer, $\Gamma$, for said selected check channel, wherein said channel quality estimate, $\psi_i$ is updated to $\psi + \delta$, said improvement counter, $\Phi$, is updated $\Phi = 0$ and said exponential back off timer, $\Gamma$, is updated to $\Gamma, = \beta$;

q) determining whether each channel in said plurality of N channels has been checked for performance;

r) upon a determination that each channel in said plurality of N channels has been checked for performance, returning to operation d) and selecting a next channel;

s) alternatively, upon a determination that each channel in said plurality of N channels has not been checked returning to operation o) and selected a next selected check channel;

t) alternatively, upon a determination that $\psi < \kappa$ for said selected check channel, determining said selected check channel is not a good channel and in a low vector state and determining whether said improvement counter is less than said exponential back off timer, $\Phi < \Gamma$, u) upon a determination that $\beta$, updating said channel quality estimate, $\psi_i$, said improvement counter, $\Phi$, and said exponential back off timer, $\Gamma$, for said selected check channel, wherein said channel quality estimate, $\psi_i$ and said exponential back off timer, $\Gamma$, retain existing values, and said improvement counter, $\phi$, is updated to $\phi = \phi + \beta$, and returning to operation q);

v) alternatively, upon a determination that $\Phi \geq \Gamma$, sending a test packet over said selected check channel;

w) determining whether said test packet transmission was successful;

x) upon a determination said test packet transmission was not successful, updating said channel quality estimate, $\psi_i$, said improvement counter, $\Phi$, and said exponential back off timer, $\Gamma$, for said selected check channel, wherein said channel quality estimate, $\psi_i$, retains an existing value, said improvement counter, $\Phi$, is updated to $\Phi = \Phi + \beta$, and said exponential back off timer, $\Gamma$ is updated to $\Gamma = 2\Gamma$ and returning to operation q); and y) alternatively, upon a determination said test packet transmission was successful, returning to operation p).

2. The method of claim 1 wherein in operation b) said channel quality estimate threshold $\kappa$ is initialized to a value where $0 < \kappa < 1$, said transition threshold $\beta$ is initialized to a value where $2N < \beta < 0N$, where N is the number of channels in a system, and said dynamic counter C is initialized to zero (0).

3. The method of claim 1 wherein each of said N channels are placed in either a desirable state vector or an undesirable state vector based upon a channel quality estimate, $\psi$, associated with each said channel, and further wherein said state vectors are arranged from a highest state vector representing a highest level of desirability of use and a highest channel quality estimate, $\psi$ decreasing to a lowest state vector representing a lowest level of desirability of use and a lowest channel quality estimate, $\psi$.

4. The method of claim 3 wherein said channel associated with a lowest state vector is not selectable for use in transmission.

5. The method of claim 1 wherein a channel having the highest channel quality estimate, $\psi$ is considered in a highest state vector and considered for selection first, and when a channel is unavailable from a higher desirable state vector, a channel associated with next highest desirable state vector is eligible for selection.

* * * * *